(12) United States Patent
Grundemann et al.

(10) Patent No.: US 9,806,986 B2
(45) Date of Patent: *Oct. 31, 2017

(54) OVERLAY NETWORK

(71) Applicant: Cable Television Laboratories, Inc., Louisville, CO (US)

(72) Inventors: Christopher Grundemann, Denver, CO (US); Christopher J. Donley, Broomfield, CO (US); Vikas Sarawat, Broomfield, CO (US); Karthik Sundaresan, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,377

(22) Filed: Jul. 13, 2015

(65) Prior Publication Data
US 2015/0319075 A1 Nov. 5, 2015

Related U.S. Application Data

(63) Continuation of application No. 13/652,700, filed on Oct. 16, 2012, now Pat. No. 9,083,650.

(51) Int. Cl.
*G06F 15/177* (2006.01)
*H04L 12/715* (2013.01)
*H04L 12/721* (2013.01)
*H04L 29/12* (2006.01)

(52) U.S. Cl.
CPC ........... *H04L 45/04* (2013.01); *H04L 45/14* (2013.01); *H04L 45/64* (2013.01); *H04L 61/2015* (2013.01); *H04L 61/2061* (2013.01); *H04L 61/2092* (2013.01); *H04L 61/2514* (2013.01); *H04L 61/6059* (2013.01)

(58) Field of Classification Search
USPC ........................................................ 709/220
See application file for complete search history.

(56) References Cited

U.S. PATENT DOCUMENTS

| | | | |
|---|---|---|---|
| 6,958,988 B1 * | 10/2005 | Okagawa | H04L 12/189 370/331 |
| 7,062,782 B1 | 6/2006 | Stone | |
| 7,154,891 B1 | 12/2006 | Callon | |
| 7,310,664 B1 | 12/2007 | Merchant et al. | |
| 7,774,500 B1 | 8/2010 | DSouza | |
| 8,060,623 B2 | 11/2011 | Vogel | |
| 8,161,194 B2 | 4/2012 | DSouza | |
| 8,612,627 B1 * | 12/2013 | Brandwine | H04L 69/14 370/238 |
| 8,683,023 B1 * | 3/2014 | Brandwine | H04L 45/64 709/220 |

(Continued)

*Primary Examiner* — Razu A Miah
(74) *Attorney, Agent, or Firm* — Great Lakes Intellectual Property, PLLC

(57) ABSTRACT

An overlay network is contemplated. The overlay network may be characterized as supporting, or at least virtually supporting, separate networks over a common infrastructure. The common infrastructure may be comprised of a plurality of routers or other devices configured to facilitate directing messages according to various addressing requirements. The use of the separate networks may be dictated according to the particular addressing requirements of each message desired for transport.

19 Claims, 5 Drawing Sheets

(56) References Cited

U.S. PATENT DOCUMENTS

| | | | |
|---|---|---|---|
| 9,467,478 B1* | 10/2016 | Khan | H04L 63/205 |
| 2003/0002512 A1 | 1/2003 | Kalmanek | |
| 2003/0031192 A1* | 2/2003 | Furuno | H04L 12/4633 |
| | | | 370/409 |
| 2003/0112755 A1* | 6/2003 | McDysan | H04L 12/4641 |
| | | | 370/230 |
| 2003/0172145 A1 | 9/2003 | Nguyen | |
| 2004/0260834 A1* | 12/2004 | Lindholm | H04L 45/02 |
| | | | 709/238 |
| 2005/0175341 A1* | 8/2005 | Ovadia | H04L 29/06 |
| | | | 398/43 |
| 2006/0187854 A1* | 8/2006 | Booth, III | H04L 12/4641 |
| | | | 370/254 |
| 2006/0187855 A1* | 8/2006 | Booth, III | H04L 41/0253 |
| | | | 370/254 |
| 2006/0218267 A1 | 9/2006 | Khan | |
| 2007/0025344 A1 | 2/2007 | Rothman | |
| 2008/0112404 A1* | 5/2008 | Kuri | H04L 12/1886 |
| | | | 370/389 |
| 2008/0298370 A1* | 12/2008 | Yoshimoto | H04L 45/00 |
| | | | 370/395.31 |
| 2008/0320111 A1 | 12/2008 | Yan | |
| 2009/0037899 A1 | 2/2009 | Dharap | |
| 2010/0157899 A1 | 6/2010 | Manz | |
| 2010/0287266 A1* | 11/2010 | Asati | H04L 12/4641 |
| | | | 709/222 |
| 2010/0322108 A1 | 12/2010 | Dsouza | |
| 2011/0161657 A1* | 6/2011 | So | H04L 29/12207 |
| | | | 713/153 |
| 2011/0280134 A1 | 11/2011 | Zheng | |
| 2011/0320310 A1 | 12/2011 | Brewer | |
| 2012/0033674 A1* | 2/2012 | Balus | H04L 29/06 |
| | | | 370/400 |
| 2012/0089707 A1 | 4/2012 | Baba | |
| 2012/0254350 A1 | 10/2012 | Ito | |

* cited by examiner

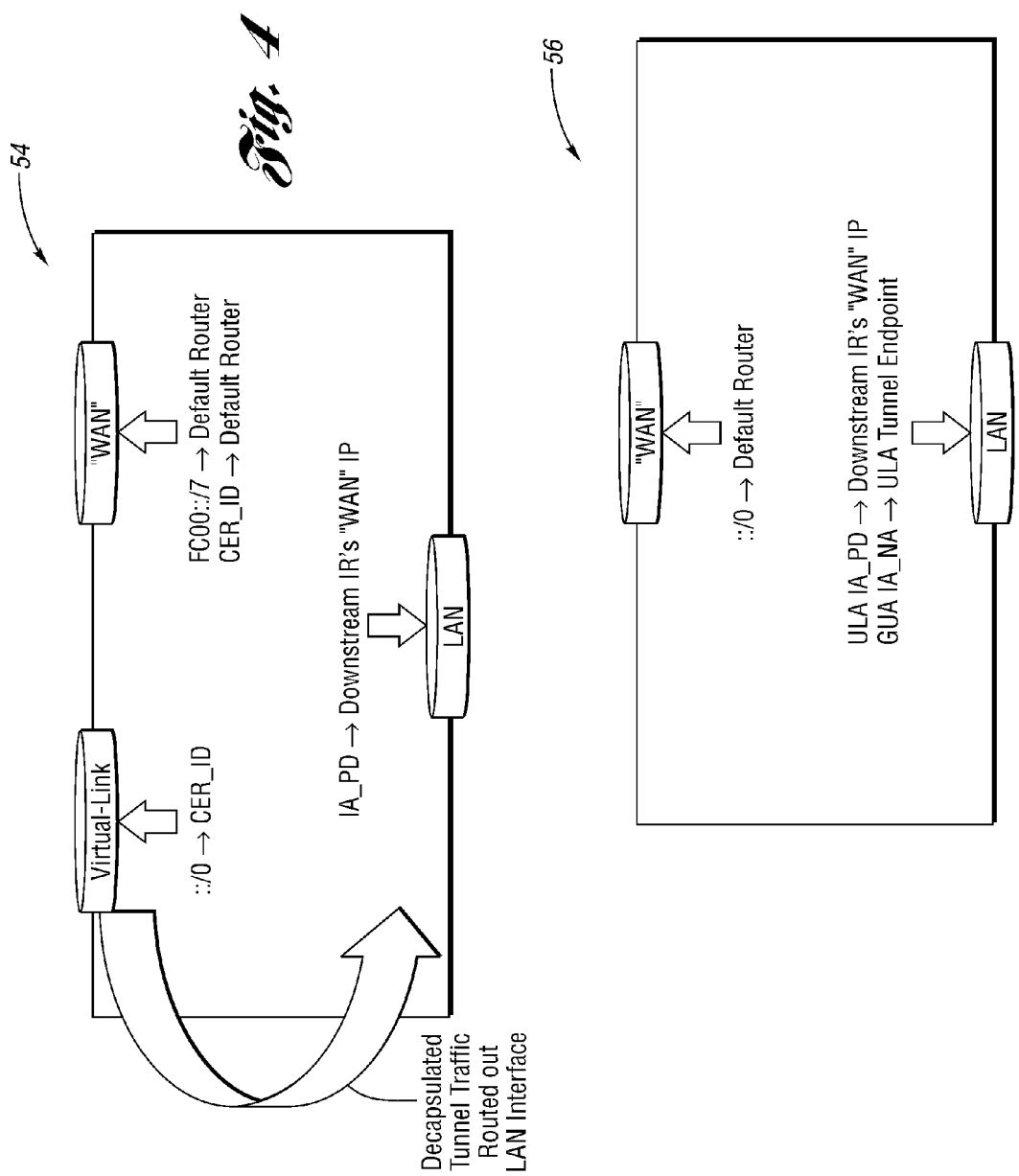

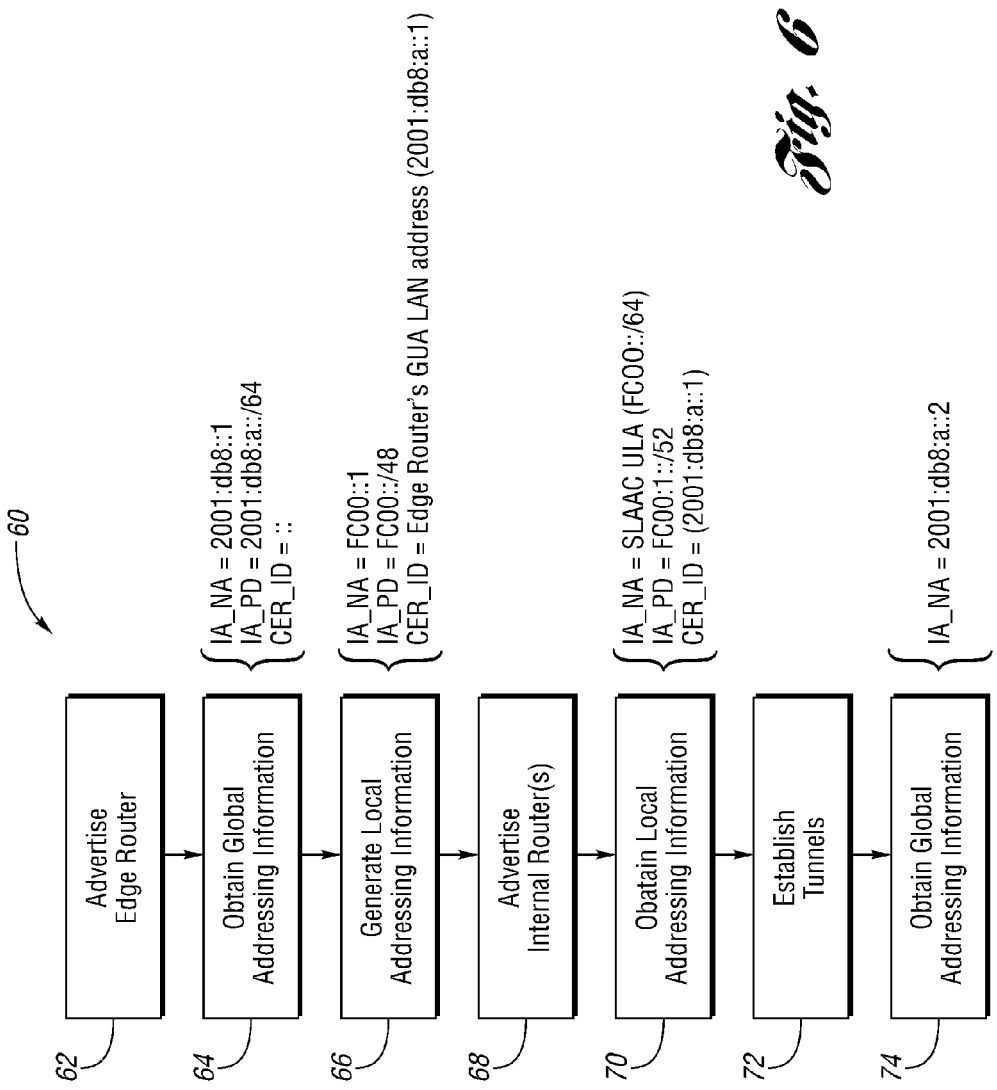

OVERLAY NETWORK

CROSS-REFERENCE TO RELATED APPLICATIONS

This application is a continuation of U.S. application Ser. No. 13/652,700, filed Oct. 16, 2012 the disclosure and benefit of which is hereby incorporated in its entirety by reference herein.

TECHNICAL FIELD

The present invention relates to overlaying one network over another using the same infrastructure.

BACKGROUND

An Internet service provider (ISP) or other service provider may provide high-speed data and other communication dependent services to a plurality of customers. The customers may rely on signals carried over a network of the service provider in order to facilitate messaging and other services for types of customer devices. The ISP may be tasked with assuring that the devices receive addresses suitable to facilitate the desired communications, and in some cases, other operational performances of a network to which they connect. As more and more customers desire the use of more and more devices, the ISPs are tasked with ever increasing demands to properly manage address allocations and other network related administrations. This can become problematic for the ISPs. Accordingly, a need exists to ameliorate the processing demands associated with managing the allocation of network address and other operational configurations of networks.

BRIEF DESCRIPTION OF THE DRAWINGS

FIG. 4 illustrates a routing table associated with an internal router in accordance with one non-limiting aspect of the present invention.

FIG. 5 illustrates a routing table associated with an edge router in accordance with one non-limiting aspect of the present invention.

FIG. 6 illustrates a flowchart of a method for network provisioning in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
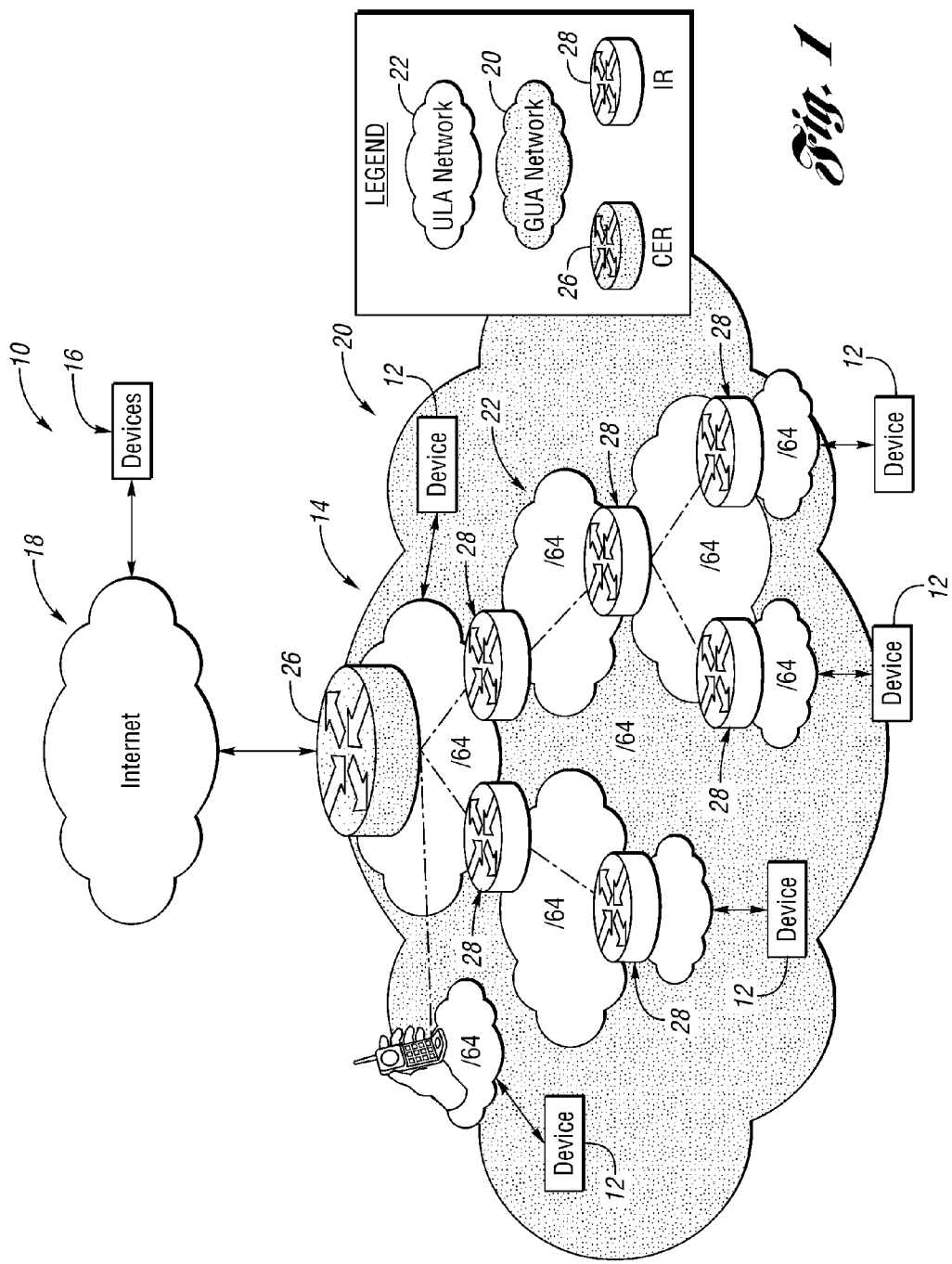
FIG. 1 illustrates an overlay network in accordance with one non-limiting aspect of the present invention.

FIG. 1 illustrates a networking system 10 as contemplated by one non-limiting aspect of the present invention. The system 10 is described for exemplary purposes with respect to facilitating messaging between a plurality of inside devices 12 connected to an inside network 14 and outside devices 16 connected to an outside network 18. The outside network 18 is illustrated to be the Internet but could be any type of other network external to the inside network 14. The inside network 14 may be comprised of first and second networks 20, 22 where one of the networks 20, 22 is overlaid over the other one of the networks 20, 22 using the same infrastructure such that the inside network 14 is considered to be an overlay network. The inside network 14 is predominately described with respect to having a global unique address (GUA) network 20 over a unique local address (ULA) network 22. The GUA network 20 may be considered to be overlaid over the ULA network 22 in the event both networks 20, 22 rely upon at least some of the same routers, gateways, or other network type of devices to facilitate signal communications between the outside devices 16 and one or more of the inside devices 12.

The ULA network 22 may be distinguished from the GUA network 20 in that messaging traveling over the ULA network 22 only needs to have unique local addresses (ULAs) whereas messaging traveling over the GUAs network may be required to have globally unique addresses (GUAs). The ULAs may be distinguished from the GUAs is in that the related addresses may be unique only to the devices 12 connected to the inside network 14 whereas the GUAs may be unique to the devices 12, 16 connected to the inside network 14 as well as the outside network 18, e.g., one of the ULAs may be shared between an inside device 12 and an outside device 16 whereas the GUAs may not be shared between any two devices 12, 16, regardless of whether the devices 12, 16 considered to be an inside device 12 or an outside device 16. While the ULA network 22 and the GUA network 20 may share at least some portion of the same infrastructure, the networks 20, 22 may nonetheless be demarcated as first and second networks 20, 22 due to their disparate addressing preferences and/or other operating characteristics that cause them to be at least virtually distinct.

An edge router (CER) 16 may be configured to interface messaging with the Internet and the inside devices 12, optionally with assistance from a plurality of internal routers (IR) 18. The edge router 26 may define the boundary between local messaging and global messaging. The local messaging may correspond with messaging that travels completely inside of the edge router 26 between the locally connected inside devices 12 whereas the global messaging may correspond with messaging that travels, at least partially, outside of the edge router 26 to the outside devices 16, i.e., a device 16 not otherwise directly connected to one of the ULA network 22 or the GUA network 20 inside of the edge router 26. The edge router 26 may be a gateway, cable modem, set top box (STB) or other suitably configured device. The edge router 26 may be provided by a multiple system operator (MSO), such as but not necessary limited to a cable, satellite or broadcast television operator, a cellular or mobile phone system operator, an Internet service provider (ISP) or some other type of operator having capabilities to facilitate messaging between multiple entities. The edge router 26 may be associated with a home, a business, a campus or other entity where it may be desirable to have a single device interface or access point to the Internet or other global/outside network 18 for the plurality of locally connected end devices 12.

A plurality of internal routers 28 may be connected between the edge router 26 and one or more of the inside devices 12 to facilitate messaging. The internal routers 28 may be configured to route or otherwise direct messaging between the locally connected inside devices 12 themselves and/or between the inside devices 12 and the outside devices 16. The internal routers 28 may be differentiated from the edge router 26 in order to present a hierarchical structure where the edge router 26 is considered to be at the top of the hierarchy and the internal routers 28 are considered to be at lower layers. The internal router layers may be differentiated based on a number of routers 28 connected between it and the edge router 26 and/or its direct connection to one of the inside devices 12, e.g., the lower layer routers may be those closest to the devices 12 or those which connect to intermediary routers 28. The edge router 26 and the internal routers 28 may be configured to have similar operating capabilities. The edge router 26 and the internal routers 28 may be configured to comply with RFC 6204, RFC 6204BIF, and IPv4 and IPv6 eRouter Specification (CM-SP-eRouter-I08-120329), the disclosures of which are hereby incorporated by reference in their entirety. While the routers 26, 28 are shown to be standalone devices, the routers 26, 28 may be integrated into other devices having capabilities sufficient to facilitate operations similar to a router, such as the illustrated cellular phone.

The routers 26, 28 may be configured to be freely added and removed in order to expand or contract the system 10. The routers 26, 28 may be provisioned by one or both of the edge router 26 or another administrative entity (not shown), which may optionally be connected to the outside network 18, to facilitate the operations contemplated by the present invention. The routers 26, 28 may be provisioned to facilitate overlaying of the ULA network 22 and the GUA network 20. The system 10 is described with respect to provisioning the ULA and GUA networks 20, 22 according to Internet protocol version 6 (IPv6) with the understanding that other protocols and messaging standards may be used without deviating from the scope and contemplation of the present invention. In this manner, the inside network 14 may be configured to support certain types of messaging over the ULA network 22 and other types of messaging over the GUA network 20, which is described below in more detail. The ability of the present invention to support separate operational configurations with the at least two networks 20, 22 allows one or both of the networks to be expanded or controlled differently than other one of the networks 20, 22. This may be useful, for example, in allowing a local network administrator to dictate configuration of the ULA network 22 and an ISP or other service provider to dictate configuration of the GUA network 20 without the two operational administrators having to obtain permissions from each other.

Figure 2:
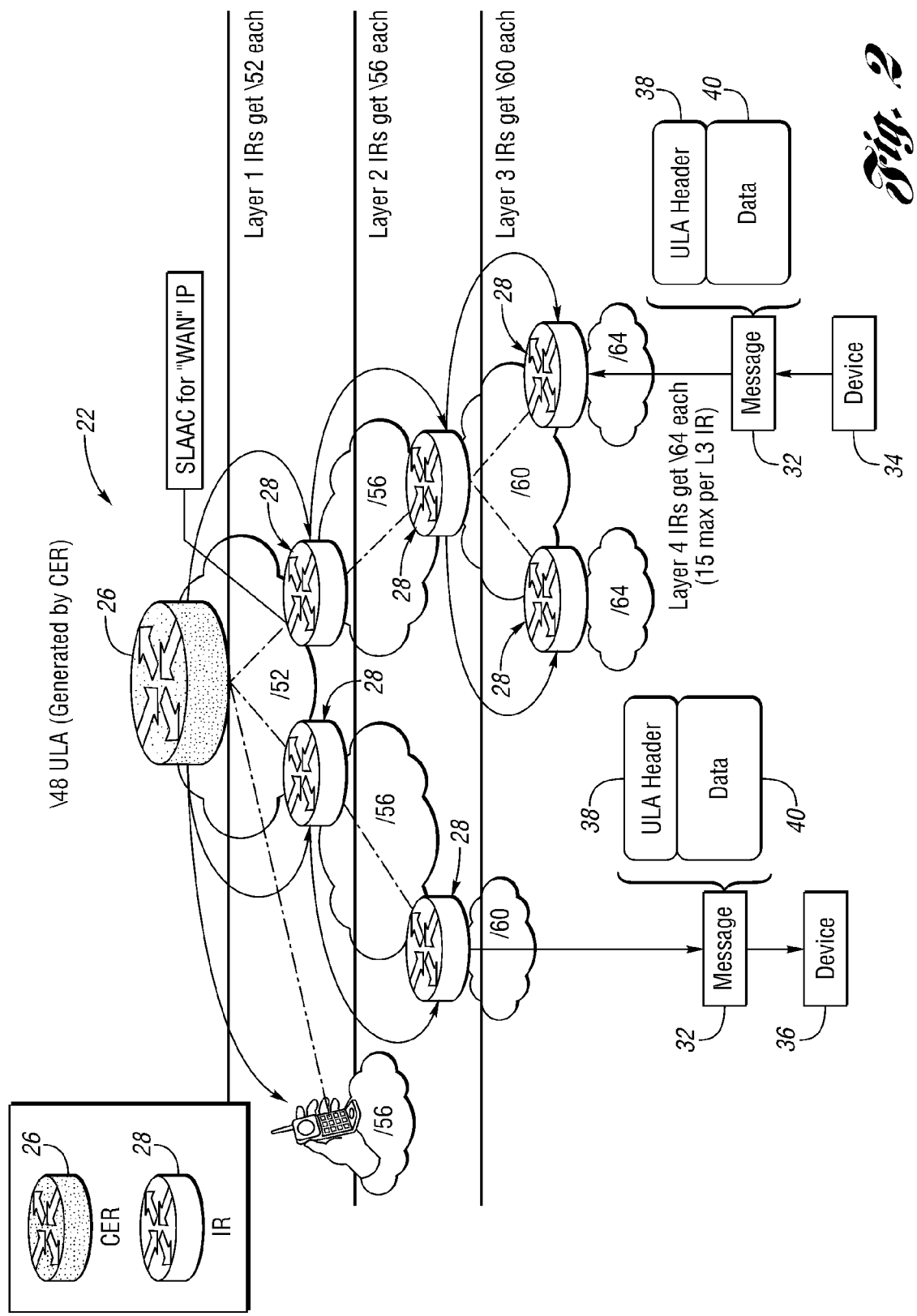
FIG. 2 illustrates provisioning of a ULA network in accordance with one non-limiting aspect of the present invention.

FIG. 2 illustrates provisioning of the ULA network 22 in accordance with one non-limiting aspect of the present invention. The ULA network provisioning is described for non-limiting purposes with respect to the edge router 26 dictating distribution of a ULA prefix to the internal routers 28, e.g. using DHCPv6 Prefix Delegation (PD) [RFC 3633], the disclosure of which is hereby incorporated by reference in its entirety. The edge router 26 may be configured to create a pseudo-random ULA /48 prefix and then to distribute corresponding lower-level prefixes to each of the internal routers 28. This prefix generation may be performed in accordance with RFC 4193, the disclosure of which is hereby incorporated by reference in its entirety. As shown, the layer 1 internal routers receive a /52 prefix, the layer 2 internal routers receive a /56 prefix, and the layer 3 internal routers receive a /64 prefix. These prefixes are noted herein as ULA prefixes since they are derived from a pseudo-random process of the edge router 26 to be unique only to the ULA network 22, i.e., the corresponding ULA addresses would not necessarily be unique outside of the edge router 26 or over the Internet 18. The inside devices 12 may connect to or otherwise be provisioned by one of the internal routers 28 with ULA addresses sufficient for use with communicating with other ones of the locally connected end devices 12.

The edge router 26 may be configured to facilitate the contemplated provisioning of the ULA network 22 and the distribution of the ULA prefixes to the internal routers 28 for use in assigning ULA addresses to the inside devices 12. The edge router 26 may be configured to automatically facilitate the contemplated provisioning so as to allow devices 12 and/or routers 28 to be freely connected to and removed from the ULA network 22. The edge router 26 may optionally facilitate the provisioning without notify the ISP of the address allocations or other provisioning parameters of the ULA network 22. This may be beneficial in allowing a local network administrator to selected desirable address ranges for ULA addresses and/or to select other network characteristics independent of operator requirements and/or without burdening the ISP with keeping track of the corresponding characteristics. The self-provisioning capability of the system 10, at least with respect to the ULA network 22, may also be beneficial in hiding or otherwise concealing the configuration and hierarchy of the ULA network 22 and the devices 12 connected thereto from elements connected to the outside network 18. The ULA may be provided to the inside devices 12 and internal routers 28 without consuming ISP dedicated addresses (i.e., GUAs) or otherwise being tracked or managed by the ISP, The edge router 26 may be solely responsible for tracking and managing the ULA addresses and the distribution of the corresponding ULA prefixes.

A message 32 transmitted from one inside device 34 to another inside device 36 may be configured with a ULA header 38 and a data portion 40. The ULA header 38 may include ULA network related information necessary for use by the routers 28 to facilitate directing the corresponding data portion 40 through the ULA network 22 between the sending device 34 and the receiving device 36, i.e., the ULA address of the sending device 34 would be the source address and the ULA address of the receiving device 36 would be the destination address. The ULA header 38, for example, may include the ULA addresses for the source and destination addresses used to represent the sending and receiving device 34, 36 and other information regarding the nature of the data portion 40. The ULA header 38 may be formatted according to IPv6 or other messaging protocols or formats. As shown, the ULA header 38 remains with the data portion 40 as the message transmits through the ULA network 22. The internal routers 28 interconnecting the sending and receiving devices 34, 36 may append additional information to the ULA header 38 and/or remove some information from the ULA header 38 during transmission, however, the ULA header 38 generally remains present in some form similar its original form during the entire transmission.

Figure 3:
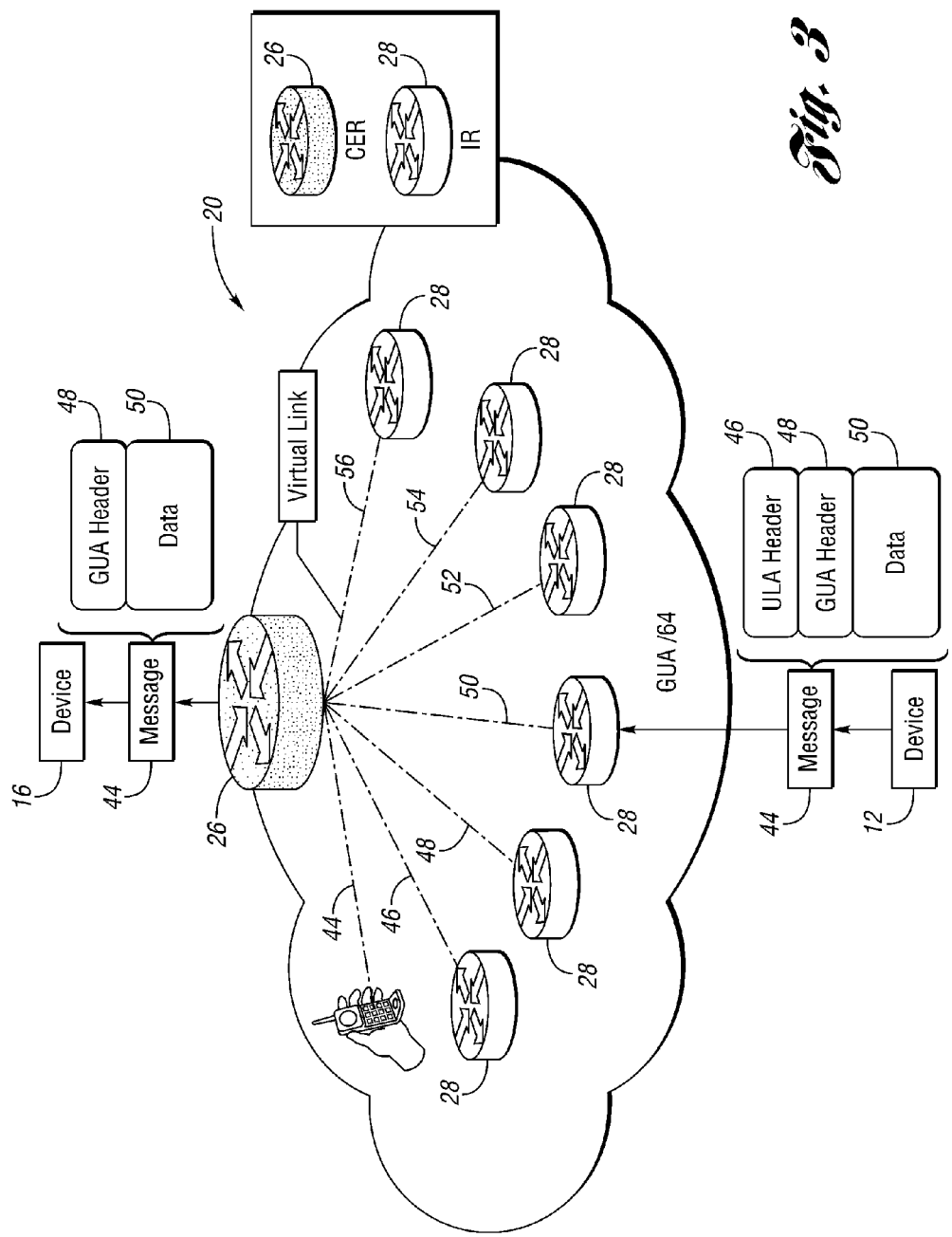
FIG. 3 illustrates provisioning of a GUA network in accordance with one non-limiting aspect of the present invention.

FIG. 3 illustrates provisioning of the GUA network 20 in accordance with one non-limiting aspect of the present invention. The GUA network 20 may be configured to facilitate global messaging or other types of communications external to the edge router 26, such as those that are required to be carried over the Internet 18. The GUA network 20 may be a tunneled network in that communications between the end devices 12 and the Internet 18 or other devices 16 external to edge router 26 are tunneled between the lowest layer router 28 connected to the communicating device 12 and the edge router 26. A plurality of tunnels 44, 46, 48, 50, 52, 54, 56 are shown to illustrate corresponding communication paths between the lowest layer routers 28 and the edge router 26. The tunnels 44, 46, 48, 50, 52, 54, 56 may be created in accordance with RFC 2473, the disclosure of which is hereby incorporated by reference in its entirety. The tunnels 44, 46, 48, 50, 52, 54, 56 may traverse multiple intermediary-layered routers to facilitate transmitting messages between the edge router 26 and the communicating device 12. The originating inside device 12 may be configured to encapsulate or otherwise package tunneled messaging for communication to the edge router 26 whereupon the edge router 26 may be configured to decapsulate the tunnel messaging for subsequent publication over the Internet 18 or other network external to the edge router 26.

The inside device 12 may rely upon the ULA addresses to facilitate communications with the edge router 26 sufficient to generate the desired tunnel 50. The inside device 12 may then communicate through the corresponding tunnel 50 with the edge router 26 in order to facilitate provisioning of a GUA address. The GUA address may correspond with a globally unique address suitable for use in facilitating communications over networks 18 external to the edge router 26, i.e., the GUA address may be globally unique and sufficient to facilitate communications over the Internet 18. The GUA address uniquely provided to each end device 12 may be selected by the edge router 26 from those available within a pool of ISP provided addresses. The ISP or other operator may provide a GUA prefix to the edge router 26 for use in selecting the GUA addresses for each of the end devices 12. One non-limiting aspect of the present invention contemplates ameliorating the number of GUA addresses and GUA prefixes that an ISP must monitor for a particular edge router 26. This may be accomplished by providing a single /64 prefix to the edge router 26 for use in distributing the GUA addresses to each of the end devices 12. The /64 prefix may be preferable in that it cannot be subnetted and, at least if it is selected in accordance with IPv6, there should be a sufficient number to facilitate distribution to virtually any number of edge routers.

The present invention contemplates limiting use of the GUAs to one tunneled-based communications. The construction of the tunnels may be dependent on assignment of the ULA addresses in that the a message 44 being transmitted from one of the inside devices 12 to an outside device 16 may need require ULA information sufficient to facilitate transmission within one of the tunnels 50 to the edge router 26. Such a message 44 is shown to include a ULA header 46, a GUA header 48 and a data portion 50. The ULA header 46 may include information sufficient to facilitate transmission through the tunnel 50 between the originating inside device 12 and the edge router 26, which may be facilitated with use of the ULA addresses assigned to the inside device 12. The GUA header 48 may include information sufficient to facilitate continued transmission of the data portion 50 over the outside network 18. The GUA header 48 may be formatted according to IPv6 or some other global messaging protocol. The GUA header 48 may be distinguishable from the ULA header 46 such that the ULA header 46 can be removed by the edge router 26 prior to the message 44 being directed to the outside network 18. In this manner, the GUA/outside message (GUA header and the data portion) may be considered to be encapsulated within a ULA/inside message (ULA header). The contents of the GUA header 48 may remain consistent or unchanged while the message traverses the tunnel 50 to the edge router 26, e.g., it may not be updated or appended to in the manner described with respect to the ULA header 28 described with respect to FIG. 2.

The inside devices 12 may begin communicating over the Internet 18 and to other devices 16 external to the edge router 26 upon assignment of a GUA address. The inside devices 12 may be configured to facilitate message transmissions using an appropriate one of the ULAs and GUAs depending on whether the messages are intended to be transmitted internally or externally to the edge router 26. The inside devices 12 may include an application capable of performing a matching operation to determine the appropriate use of ULAs and GUAs, and if a GUA is uses, the appropriate tunnel 44, 46, 48, 50, 52, 54, 56 to the edge router 26. The routers 26, 28 may then analyze the selected one of the ULAs and GUAs to facilitate routing of the corresponding message, such as by comparing the addresses to a routing table. FIG. 4 illustrates a routing table 54 associated with an internal router 28 in accordance with one non-limiting aspect of the present invention. FIG. 5 illustrates a routing table 56 associated with the edge router 26 in accordance with one non-limiting aspect of the present invention. The routing tables 54, 56 generally relate to the processes incorporated by a corresponding router 26, 28 to facilitate routing messaging between one or more available interfaces.

The internal router routing table 54 is shown to include one downstream interface and two upstream interfaces. The downstream interface may be local area network (LAN) or other suitable interface connected to a transmitting one of the end devices. The two upstream interfaces may include a virtual-link interface and a wide area network (WAN) interface. The virtual-link interface may be associated with the tunnel used to communicate directly with the edge router. The WAN interface may be used to communicate with an upper-level internal router or the edge router. The communications transmitted through the virtual link may be considered to be carried over the GUA network 20 and the communications transmitted through the WAN interface may be considered to be carried over the ULA network. In this manner, the ULA network 22 and the GUA network 20 may be considered to be overlaid over the same infrastructure. The corresponding messaging, after traversing over one of the ULA or GUA networks 20, 22, may then be interfaced between similar WAN and LAN interfaces of the edge router 26 or other internal routers 28.

The routing tables 54, 56 are shown to include address specific routing rules. A first rule of the internal router routing table 54 relates to upstream routing of messages having addresses falling within the "::/0" range (a "default route") to the edge router (the address of the edge router is shown as CER_ID) through the virtual-link interface, i.e., through one of the tunnels. The addresses falling within the first rule correspond with any of the GUA addresses assigned to the inside devices 12. A second rule relates to upstream routing of messages having addresses falling within "FC00::/7" and "CER_ID" ranges to the default router, which may be the next higher internal router or the edge router 26. The addresses falling within the second rule correspond with the GUA address assigned to the edge router 26 (e.g., CER_ID) or the ULA addresses assigned to the inside devices 12 such that the corresponding messages are transmitted to the edge router 26 or one of the inside devices 12 over the ULA network 22. The "FC00::/7" corresponds with unique local unicast address types designated within IPv6 but any other rule may be used to facilitate filtering the ULAs to avoid transmitting ULA related messages through the virtual-link interface. A third rule of the internal router relates to downstream routing of messages to a lower level internal router 28 or an inside device 12 according to an Internet address prefix ("IA_PD") included within the message, i.e., the prefix will be analyzed by the internal router to determine appropriate routing path to the end device.

The edge router routing table 56 may include a first rule for routing upstream messages. The upstream messages are those intended to be communicated over the Internet 18 such that any address within the "::/0" range (a "default route") qualifies, i.e., any GUA address. (While it is possible for the ULA network connected end devices 12 to communicate with each other through use of the GUAs assigned to each, the matching application contemplated by the present invention would prioritize use of the ULAs assigned to the devices 12 over the GUAs.) A second rule of the edge router routing table 56 relates to directing downstream messaging through the GUA network using one of the tunnels 44, 46, 48, 50, 52, 54, 56 or through ULA network 22 using the internal routers 28. The "ULA IA_ PD" range may be used to identify addressing falling within the ULA prefix used for the ULA network 22 such that the corresponding messages are routed to a WAN interface of a lower level router or to one of the inside devices 12. The "GUA IA_NA" ranges may be used to identify addressing assigned within the GUA prefix of the edge router 26 such that the corresponding messages are routed to the tunnel 44, 46, 48, 50, 52, 54, 56 associated with the inside device 12 having the corresponding GUA. The tunnels 44, 46, 48, 50, 52, 54, 56 may be established using ULA messages between the edge router 26 and the inside devices 12 such that the corresponding tunnel 44, 46, 48, 50, 52, 54, 56 may be tracked and identified or represented with a "ULA tunnel endpoint" label.

FIG. 6 illustrates a flowchart 60 of a method for network provisioning in accordance with one non-limiting aspect of the present invention. The method is described with respect to provisioning a network to facilitate overlaying local and global networks according to the IPv6 protocol. This is done for exemplary non-limited purposes as the present invention fully contemplates its use and application in any number of environments and with any number of protocols. The method may be embodied in a computer-readable medium having instructions stored thereon, which when executed in cooperation with a processor or other suitable device, facilitate issuing instructions or commands sufficient to achieve the operations and processes contemplated by the present invention. The method is predominately described with respect to facilitating provisioning of a network comprised of a plurality of routers, however, the method may be used with other types of devices and is not necessary limited to routers or devices having capabilities similar to routers, i.e., the method generally relates to any network provisioning process where it may be desirable to overlay two or more networks.

Block 62 relates to an edge router receiving a routing advertisement (RA) from the ISP or other device associated with outside network, such as but not necessary limited to a cable modem termination station (CMTS) associated with a cable service provider or a similar type of regional device associated with a telephone or cellular service provider of high-speed data. The edge router may be configured to broadcast its presence when connected to the outside network in order to provoke the server into transmitting the edge router an appropriate routing advertisement. The routing advertisement may include various fields and parameters, such as those specified according to an IPv6. The routing advertisement may optionally include the manage address bit and other address bit (M&O bits) being set to 1 in order to ensure both are true, which notifies the edge router that IPv6 is available and that DHCP can be used to provision the edge router and thereafter by the edge router to facilitate configuring internal routers.

Block 64 relates to the edge router obtaining global addressing information. This may relate to the edge router being provided with addressing information sufficient for use in communicating over the outside network, e.g., a GUA. The information may be provided to the edge router as part of a DHCPv6 exchange and include fields for network address (IN_NA), prefix designation (IA_PD), and customer edge router identifier (CER_ID). The network address may be a global unique address provided by the ISP for the edge route, e.g. 2001:db8::1. The prefix designation may be used to identify a range of global unique addresses to be allocated by the edge router to the inside devices, e.g., 2001:db8:a::/64. The customer edge router identifier may be provided with "::" or blank in order to identify the edge router as a "top" device within a hierarchy of structure. This global unique addressing information may be allocated according to networking requirements of the ISP. This type of information may be provided by the ISP to a plurality of edge routers associated with different customers or other entities intending to configure their own inside networks such that each edge router may be provided with a global unique address and a prefix for use in allocating globally unique addresses. (Optionally, the prefix does not need track or be related to the network address assigned to the edge router).

Block 66 relates to the edge router generating local addressing information, such as the local addressing information necessary to facilitate establishing the ULA network and its related communications. The local addressing information may include fields for network address (IN_NA), prefix designation (IA_PD), and hierarchy identifier (CER_ID). The network address may be a local address generated by the edge router, e.g. FC00::1. The prefix designation may be a local designation generated by the edge router and reflective of its position at the top of the ULA network hierarchy, e.g., FC00::/48. The hierarchy identifier may be used to identify the edge routers GUA LAN address to be used by the internal routers for communicating with the edge router.

Block 68 relates to the internal routers performing a process similar to that described above with respect to the edge router and ISP except for the edge router acting as the ISP in providing addressing information to each of the internal routers. The internal routers then use this information to generate local addressing information similar to that generated by the edge router in block, i.e., a network address, a prefix designation below the higher router, and an identifier of the edge routers GUA LAN address. This may include the edge router providing a router advertisement for the ULA prefix with the managed address bit (M) set to 0, the other address bit (O) set to 1, and an auto-configuration address bit set to 1 in order to instruct the receiving router/device not to ask for DHCP, to receive a prefix designation but not an address, and to generate an address themselves without using DHCP, e.g., using StateLess Address Auto Configuration (SLAAC). This use of SLAAC may be desirable if devices are limited to accepting DHCP information from one DHCP server. In this case, the ULA information is coming from the local router and the GUA information is coming from the CER—if DHCP were used for both the ULA and GUA addresses, devices may end up with only one or the other at any time (depending on if they chose the CER or local router as their one DHCP server). The combined use of SLAAC and DHCP has an added benefit of allowing device manufacturers to ensure that their device is non-Internet-reachable by simply leaving DHCP off by default (or leaving DHCP support out altogether).

Block 70 relates to the inside devices and/or lower-level routers obtaining local addressing information from the connected to internal router. This may include fields for network address (IN_NA), prefix designation (IA_PD), and hierarchy identifier (CER_ID). The network address may be unique to the ULA network, e.g., FC00::/64. The prefix designation may be provided in the event the device desires at some point to act as a router, or is a lower level internal router, and is illustrated to designated as being one level below the edge router (although other designations may be used), e.g., FC00:1::/52. The hierarchy identifier may identify the GUA LAN address of the edge router in order to notify the device of the top router within the networking system into facilitate trek communications with the edge router.

Block 72 relates establishing tunnels between the inside devices and the edge router. This may provide individual links between each of the lowest layer routers and/or the devices in the edge router through which GUA related communications are to traverse. The tunnels may be established using messaging exchange between the routers inside or devices addressed according to the information generated above. The internal routers associated with each segment of the tunnel may be configured to transmit router advertisements with prefix information options (PIOs). In this manner, the tunnels in the following GUA related communications, may be established using ULA related messaging and operations such that the corresponding GUA network may be considered to be overlaid on the same infrastructure as the ULA network.

Block 74 relates to providing the inside devices global addressing information sufficient to facilitate indications over the outside network, i.e., a GUA address. The GUA address may be provided through directly from the edge router through the tunnel to an appropriate one of the inside devices. The particular GUA address provided by the edge router may be from within the prefix designation allocated in block, e.g., 2001:db8:a::2. Once provisioned with the ULA and GUA information, the devices may communicate selectively over the ULA and GUA networks depending on the destination of the corresponding messaging/signaling, as described above. The Blocks associated with establishing the tunnels and providing the GUAs may be omitted for certain inside devices in the event it is desirable for security reasons or otherwise to prevent those devices from communication over the outside network 18 or from being exposed outside of the edge router 26.

The foregoing process may be summarized as follows:
CER Receives RA with M&O bits set to 1
CER initiates DHCPv6 with MSO server
   IA_NA, IA_PD, CER_ID
   IA_PD hint for largest prefix it can handle (e.g. /48)
   MSO Server responds with
      WAN IPv6 Address (IA_NA)
      Home IPv6 Prefix (IA_PD), e.g. /64
      CER_ID (Blank or ::)
CER creates pseudo-random ULA /48 prefix [RFC 4193]
CER advertises RA for ULA prefix with M=0, O=1, A=1
   This signals attached routers to initiate DHCPv6 PD and SLAAC
Level 1 IRs perform SLAAC to generate ULA "WAN" IP
Level 1 IRs perform DHCPv6 with CER
   IR requests: IA_PD (with hint), CER_ID
   CER responds with:
      IR ULA Prefix (IA_PD), e.g. /52
      CER_ID (CER's GUA LAN IP)
Level 1 IRs now advertise RAs for ULA with M=0, O=1, A=1
Level 2 IRs and any subsequent levels follow same procedure as above for L1 IRs
IRs establish IP tunnels to CER
   Generic Packet Tunneling in IPv6 [RFC 2473]
   CER_ID includes CER's GUA IP
   Tunnel is built: IR ULA→CER GUA
CER establishes IP tunnels back to IRs
   CER sees IR ULA address as tunnel source
   Tunnel is built: CER GUA→IR ULA
   Creates bi-directional virtual-links
Once tunnels are established, IRs advertise new RA with two PIOs (M=1)
   PIO1 for ULA (A=1, L=1,—SLAAC, on-link)
   PIO2 for GUA (A=0, L=0,—DHCPv6, not on-link)
      /64 GUA prefix derived from CER_ID
IRs relay all IA_NA requests up tunnel to CER
   Hosts receive GUA via IA_NA from CER over tunnel
      Randomized addresses and short lease times are used
   IRs relay IA_NA and directly answer IA_PD
CER installs a default route based on MSO RA
IRs install a default ULA router based on RAs
   "Up" route for ULA FC00::/7
   "Up" route for CER_ID
All home routers (CER & IR) record which client(IR) each delegated ULA prefix is handed out to
   Prefix/address tuple is used to construct routing table
IRs install ::/0 default route on virtual-link to CER
CER records which relay(IR) each GUA IA_NA is handed out to
   Address/tunnel tuple is used to construct routing table One non-limiting aspect of the present invention relates to a method for auto configuring a home or small office/home (SOHO) network using IP-in-IP tunnels, creating an overlay network within the home without need for manual configuration nor a routing protocol. This invention may leverage existing protocols in a novel process that results in an auto configuring a small home, SOHO, or other network, which provides reachability, topology hiding, reduced address requirements, and other benefits. The present invention contemplates the ability of one network host to communicate with another such that If the two hosts are able to share information, they have reachability. The process described in this invention provides reachability by building two distinct logical Internet Protocol (IP) networks overlaid on the same physical infrastructure, one supporting the other. The first IP network is used by network hosts for local communication within the administrative scope of the small network. The second IP network is used by the same or a subset of the same network hosts for communication with hosts outside of the administrative scope of the small network, typically on the Internet.

Separating internal and external communication in this way provides several benefits over existing methodologies. One of which is topology hiding. This invention creates a complex internal network that can provide IP-layer separation by adding routers in an ad-hoc, as-needed way providing many security and privacy benefits. This complex internal network in turn supports a much simpler network for external reachability. In addition to providing external reachability, this simpler overlaid network effectively hides the complexity of the internal network from outside/external hosts. This is referred to as topology hiding and when combined with randomized addresses and short DHCP lease times, it is a powerful privacy and security tool. A second benefit of creating two distinct overlaid networks is that the network providing external reachability is able to use a single IP prefix, regardless of the internal network's topology, complexity, or size. This allows a very large and complex network to require only a very small global IP prefix.

The auto-configuration of network prefix and address information contemplated herein may be crucial in home and many small business offices where there is likely to be a low level of network operation experience, knowledge, and interest. The present invention may be particular beneficial in that it allows expansion of the ULA network without regard to operating constraints of the GUA network or other dictates of the ISP without having to support a network address translator (NAT) or similarly complex type of device, which by its very nature is a barrier to true end-to-end communication and causes a multitude of issues due to their routing protocols being quite "heavy weight" and requiring more advanced (and thus more expensive) routers to operate them. This invention includes a method of creating two distinct networks, overlaid on one another, which provide reachability to network hosts without requiring NAT or a routing protocol. In addition to removing the need for routing protocols and NAT, the overlay network also provides many of the benefits previously attributed to NAT. Most notably topology hiding (privacy) and the separation of external/public IP prefix size from internal network size and complexity (efficiency).

Foregoing description of the present invention contemplates use of an overlay network in order to facilitate network expansion and control without burdening an ISP with exposure to nuances of certain messages and their related networking (e.g., the ULA network). Another aspect of the present invention contemplates identifying methods that routers in a Home Network can employ to provide un-interrupted communication services when there are not enough IPv6 address prefixes available to delegate to every router in the home. This is of interest as home networks are evolving due to introduction of new services and requirements such as: 1) Need to separate network for guest and home subscribers 2) Smart home 3) Smart grid, 4) Heterogeneous layer 2 technologies with different power requirements 5) Sensor networks. Many of these require support for multiple IP networks inside the home, which in case of IPv6 requires support for prefix delegation and routing inside the home (i.e., in the absence of the overlay network noted above), which can be a problem if a sufficient number prefix designation are not available and/or if the home network grows wider or deeper than presumed, i.e., beyond the capabilities of the regional prefix.

The present invention contemplates ameliorating these concerns with a couple of novel approaches that can be used in a home network to assure un-interrupted network service when 1) CPE Edge Router (CER) is configured to not provide IPv6 prefixes to routers inside the home; and 2) CER runs out of prefixes to give to routers inside the home.

A home network can consists of diverse types of device. Some of the devices used in this disclosure include: CER: CPE Edge Router (This is an outer most router in a home network. This router has two main type of interfaces—WAN and LAN. The WAN interface of the CER is connected to the ISP and LAN interface is connected to the devices (e.g. host, Internal routers) in the home network); and IR: Internal Router (The one main difference between IR and CER is that the WAN interface of an IR is connected to the LAN interface of a CER or another IR. Like CER, IR also has at least one WAN interface and one or more LAN interface.).

One contemplated solution includes a new IR being connected to the home network where a couple of new hosts (e.g. laptops) are connected to the LAN interface on this IR. The IR requests a new IPv6 prefix from the home network and is denied the requested prefix, which means that the IR has no prefixes that it can use to assign address to the directly connected hosts (and routers). The IR can be denied prefixes either because the router (from which the prefixes are requested) is configured to not delegate prefix or the router has run out of prefixes to delegate. Upon detecting a failure to receive the requested IPv6 prefix, the IR can change its mode of operation from IP router to layer 2 switch, which allows the hosts connected to the IR to obtain IPv6 addresses from the upstream router (CER or IR) to which the IR WAN interface is connected. Alternatively, upon detecting a failure to receive the requested IPv6 prefix, the IR can change its mode of operation from IP router (with no NAT 66) to IP router (with NAT66), which allows the IR to allocate hosts on the LAN with IPv6 Unique Local IPv6 Unicast Addresses (ULA) and to them to GUA (Global Unicast Addresses) before forwarding them upstream. If further, upon detecting a failure to receive the requested IPv6 prefix, the IR can build a tunnel to the upstream IR or the CER using its WAN IPv6 address for the local endpoint, this tunnel is used as the next hop for all upstream traffic. This allows the hosts connected to the IR to obtain IPv6 addresses from the upstream router (CER or IR) to which the IR tunnel is connected.

Another contemplated solution includes a new IR, which supports multiple LANs, being connected to the home network. The WAN interface on this router is Ethernet. The LAN interface for example may include: Ethernet, Zigbee, etc. Assume a couple of hosts (e.g. laptops) are connected to the Ethernet LAN and a couple of devices are connected to the Zigbee LAN interface on the IR. The IR requests a new IPv6 prefix for each LAN that it supports and is only provided a fraction of prefixes it requested. Which essentially means, the IR does not have enough prefixes to assign to all LAN interface it supports. Upon detecting that the number of prefixes received are less than the size requested, the IR can its mode of operation from IP router to layer 2 switch for a fraction of LANs, which allows the hosts connected to these LAN to obtain IPv6 addresses from the upstream router (CER or IR) to which the IR WAN interface is connected. The IR can then use the available IPv6 prefixes to assign IPv6 addresses to the devices connected on the remaining LAN interfaces. Alternatively, upon detecting that the number of prefixes received are less than the size requested, the IR can change its mode of operation from IP router (with no NAT 66) to IP router (with NAT66), which allows the IR to allocate hosts on the LAN with IPv6 Unique Local IPv6 Unicast Addresses (ULA) addresses and converts them to GUA (Global Unicast Addresses) before forwarding them upstream. The IR can then use the available IPv6 prefixes to assign IPv6 addresses to the devices connected on the remaining LAN interfaces. Yet further, upon detecting that the number of prefixes received are less than the size requested, the IR can build a tunnel to the upstream IR or the CER using its WAN IPv6 address for the local endpoint. This tunnel can then be installed as the next-hop for a fraction of LANs and used for all upstream traffic from those LANs. This allows the hosts connected to these LAN to obtain IPv6 addresses from the upstream router (CER or IR) to which the IR tunnel is connected. The IR then uses the available IPv6 prefixes to assign IPv6 addresses to the devices connected on the remaining LAN interfaces. Still further, if the IR receives at least one /64, but a smaller prefix than requested, the IR can build a tunnel to each endpoint behind it and address all endpoints from a single /64, even without enabling bridging.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A networking system configured to facilitate message exchange between an inside network and an outside network, the system comprising:
   an edge router configured to separate the inside network from the outside network;
   one or more internal routers configured to direct messages over the inside network between the edge router and one or more inside devices;
   wherein the edge router and the internal routers include routing tables configured to control whether messages are routed over one of at least a first network and a second network formed by sharing a common infrastructure of the edge router and the internal routers, the routing tables being configured such that the messages routed over the first and second networks commonly route through a lowest layer router connected to the inside device associated therewith;
   wherein the routing tables are configured to control routing over the common infrastructure such that:
   i) a first device of the inside devices communicates over a path when communicating a first message of the messages requiring routing through the edge router over the first network, the path traversing at least one or more intermediary routers of the internal routers positioned within the common infrastructure between the edge router and the lowest layer router connected to the first device; and
   ii) the first device communicates over the path when communicating a second message of the messages requiring routing through the edge router over the second network such that the second message traverses through the same one or more intermediary routers as the first message.

2. The networking system of claim 1 wherein the routing tables are configured to facilitate routing the messages having a unique local address (ULA) as the destination address over the first network and to facilitate routing the messages having a global unique address (GUA) as the destination address over the second network, each ULA being unique over the inside network and not the outside network and each GUA being unique over the inside network and the outside network.

3. The networking system of claim 2 wherein the edge router is configured to assign the ULA to each of the inside devices according to a pseudo-random process whereby the ULAs assigned to each inside device are randomly generated by the edge router and delegated to the inside devices without exposing the ULAs to the outside devices, thereby keeping the ULAs private from the outside devices.

4. The networking system of claim 2 wherein the routing tables are configured to facilitate routing inside messages over the first network without encapsulating a data portion associated therewith, the inside messages being messages sourced from the inside devices having one of the ULAs as the destination address, the first message being one of the inside messages and being sourced from the first device with one of the ULAs as the destination address.

5. The networking system of claim 4 wherein the routing tables are configured to facilitate routing outside messages over the second network with encapsulation sufficient to transport a data portion associated therewith through one or more tunnels constructed between the edge router and the inside devices, the outside messages being messages having one of the GUAs as the destination address, the second message being one of the outside messages and being sourced from the first device with one of the GUAs as the destination address.

6. The networking system of claim 1 wherein each inside device is configured to source messages to a unique local address (ULA) destination address, referred to as inside messages, for transmission over the first network without encapsulating a data portion associated therewith.

7. The networking system of claim 6 wherein each inside device is configured to source messages to a global unique address (GUA) destination address, referred to as outside messages, for transmission over the second network with encapsulation of a data portion associated therewith.

8. The network system of claim 7 wherein the inside devices are configured to encapsulate a GUA header and the data portion of the outside messages within a ULA header having a ULA destination address assigned to the edge router to facilitate tunneling the outside messages through the second network between the sourcing inside device and the edge router.

9. The networking system claim 1 wherein the common infrastructure is a wireless infrastructure characterized by the first and second messages being wireless routed over the path between each of the edge router, the lowest layer router and the one or more intermediary routers.

10. A method of configuring an inside network comprised of a plurality of routers to facilitate communications with an outside network, inside devices connected to the inside network having been previously assigned a unique local address (ULA) and a globally unique address (GUA), the method comprising:
   instructing the plurality of routers to route inside messages over the inside network without encapsulation, the inside messages being messages having one of the ULAs as the destination address;
   instructing one or more of the plurality of routers to encapsulate outside messages for transmission over the inside network through one or more tunnels, the outside messages being messages having one of the GUAs as the destination address;
   instructing a first plurality of routers selected from the plurality of routers to facilitate routing a first message of the inside messages over the inside network according to a first path, the first path routing the first message from a first device of the inside devices connected to the inside network through each of the first plurality of routers; and instructing a second plurality of routers selected from the first plurality routers to facilitate routing a second message of the outside messages over the inside network through a first tunnel of the one or more tunnels such that the first tunnel routes through the inside network according to a second path that is at least in part infrastructurally common to and overlaid with the first path.

11. The method of claim 10 further comprising instructing a first router of the plurality of routers to assign the ULAs according to a pseudo-random algorithm and the GUAs from a /64 prefix provided by an Internet Service Provider (ISP).

12. The method of claim 10 further comprising instructing the inside devices to request the ULAs using StateLess Address Auto Configuration (SLAAC) and to request the GUAs using Dynamic Host Configuration Protocol (DHCP).

13. The method of claim 10 further comprising instructing the inside messages to be wirelessly transmitted over the inside network with no more than a ULA header and the outside messages to be wirelessly transmitted over the inside network with at least a ULA header and a GUA header.

14. A method for facilitating message exchange between an inside network and an outside network when the inside network includes an edge router configured to separate the inside network from the outside network and one or more internal routers configured to direct messages between the edge router and one or more inside devices, the method comprising:
  instructing the edge router and the internal routers with routing tables to control whether messages are routed over one of at least a first network and a second network formed by sharing a common infrastructure of the edge router and the internal routers, the routing tables being configured such that the messages routed over the first and second networks commonly route through a lowest layer router connected to the inside device associated therewith; and
  configuring the routing tables to control routing over the common infrastructure such that:
    i) a first device of the inside devices communicates over a path when communicating a first message of the messages requiring routing through the edge router over the first network, the path traversing at least one or more intermediary routers of the internal routers positioned within the common infrastructure between the edge router and the lowest layer router connected to the first device; and
    ii) the first device communicates over the path when communicating a second message of the messages requiring routing through the edge router over the second network such that the second message traverses through the same one or more intermediary routers as the first message.

15. The method of claim 14 further comprising configuring the routing tables to facilitate routing the messages having a unique local address (ULA) as the destination address over the first network and to facilitate routing the messages having a global unique address (GUA) as the destination address over the second network, each ULA being unique over the inside network and not the outside network and each GUA being unique over the inside network and the outside network.

16. The method of claim 15 further comprising instructing the edge router to assign the ULA to each of the inside devices according to a pseudo-random process whereby the ULAs assigned to each inside device are randomly generated by the edge router and delegated to the inside devices without exposing the ULAs to the outside devices, thereby keeping the ULAs private from the outside devices.

17. The method of claim 15 further comprising configuring the routing tables to facilitate routing inside messages over the first network without encapsulating a data portion associated therewith, the inside messages being messages sourced from the inside devices having one of the ULAs as the destination address, the first message being one of the inside messages and being sourced from the first device with one of the ULAs as the destination address.

18. The method of claim 17 further comprising configuring the routing tables are configured to facilitate routing outside messages over the second network with encapsulation sufficient to transport a data portion associated therewith through one or more tunnels constructed between the edge router and the inside devices, the outside messages being messages having one of the GUAs as the destination address, the second message being one of the outside messages and being sourced from the first device with one of the GUAs as the destination address.

19. The method of claim 15 further comprising:
  instructing each inside device to source messages to a unique local address (ULA) destination address, referred to as inside messages, for transmission over the first network without encapsulating a data portion associated therewith;
  instructing each inside device to source messages to a global unique address (GUA) destination address, referred to as outside messages, for transmission over the second network with encapsulation of a data portion associated therewith; and
  instructing the inside devices to encapsulate a GUA header and the data portion of a corresponding outside message within a ULA header having a ULA destination address assigned to the edge router to facilitate tunneling the outside messages through the second network between the sourcing inside device and the edge router.

* * * * *